(12) United States Patent
Fluhr et al.

(10) Patent No.: US 8,480,329 B2
(45) Date of Patent: Jul. 9, 2013

(54) COUPLING PINS FOR CONNECTING WEAPON COMPONENTS

(75) Inventors: Norbert Fluhr, Oberndorf (DE); Daniel Kohler, Oberndorf (DE)

(73) Assignee: Heckler & Koch GmbH, Oberndorf/Neckar (DE)

( * ) Notice: Subject to any disclaimer, the term of this patent is extended or adjusted under 35 U.S.C. 154(b) by 0 days.

(21) Appl. No.: 13/229,387

(22) Filed: Sep. 9, 2011

(65) Prior Publication Data

US 2012/0063841 A1 Mar. 15, 2012

Related U.S. Application Data

(63) Continuation of application No. PCT/EP2010/006731, filed on Nov. 4, 2010.

(30) Foreign Application Priority Data

Nov. 30, 2009 (DE) .......................... 10 2009 056 383

(51) Int. Cl.
*F16B 21/14* (2006.01)

(52) U.S. Cl.
USPC .......................... 403/322.2; 403/319; 403/355

(58) Field of Classification Search
USPC .............. 403/315, 316, 318, 319, 322.2, 325, 403/355; 42/75.04, 73, 124, 125, 126, 127, 42/128, 135, 136, 137, 138, 139
See application file for complete search history.

(56) References Cited

U.S. PATENT DOCUMENTS

| | | | | |
|---|---|---|---|---|
| 269,023 A | * | 12/1882 | DeLorme | 42/139 |
| 701,159 A | * | 5/1902 | Davenport | 42/75.04 |
| 2,399,581 A | * | 4/1946 | Spooner | 403/157 |
| 3,309,864 A | * | 3/1967 | Arndt et al. | 403/316 |
| 3,685,865 A | * | 8/1972 | Young | 403/316 |
| 4,068,960 A | * | 1/1978 | Swager | 403/324 |

(Continued)

FOREIGN PATENT DOCUMENTS

| EP | 1767892 A1 | 3/2007 |
|---|---|---|
| WO | 2009127301 A1 | 10/2009 |

OTHER PUBLICATIONS

Patent Cooperation Treaty, "International Search Report," issued by the International Searching Authority in connection with related PCT application No. PCT/EP2010/006731, mailed Mar. 4, 2011 (4 pages).

(Continued)

*Primary Examiner* — Michael P Ferguson

(74) *Attorney, Agent, or Firm* — Hanley, Flight and Zimmerman, LLC

(57) ABSTRACT

Coupling pins for connecting weapon components are described. An example fastener to couple weapon components includes an elongated body defining a first aperture. The first aperture being defined along a longitudinal axis of the elongated body. Tension member and a biasing element being positioned within the first aperture. The elongated body defining a second aperture. The second aperture being defined through a portion of the elongated body to enable a tension element, positioned at least partially within the second aperture, to be urged from the elongated by via an interaction with the tension member. The fastener is insertable into aligned apertures of respective first and second weapon components. The tension element being urged from the elongated body to interact with the second weapon component to urge the second weapon component into further engagement with the first weapon component.

18 Claims, 9 Drawing Sheets

U.S. PATENT DOCUMENTS

| | | | | |
|---|---|---|---|---|
| 4,094,611 | A | * | 6/1978 | Harper et al. .................. 403/316 |
| 6,041,536 | A | | 3/2000 | Samuels et al. |
| 6,467,203 | B2 | * | 10/2002 | Pippins ........................... 37/452 |
| 6,757,995 | B2 | * | 7/2004 | Pippins ........................... 37/468 |
| 7,243,454 | B1 | * | 7/2007 | Cahill ............................... 42/72 |
| 7,730,651 | B2 | * | 6/2010 | Carpenter ....................... 37/452 |
| 2010/0109348 | A1 | | 5/2010 | Boutaghou |
| 2010/0150648 | A1 | | 6/2010 | Judge et al. |

OTHER PUBLICATIONS

Patent Cooperation Treaty, "Written Opinion of the International Searching Authority," issued by the International Searching Authority in connection with related PCT application No. PCT/EP2010/006731, mailed Mar. 4, 2011 (10 pages).

\* cited by examiner

COUPLING PINS FOR CONNECTING WEAPON COMPONENTS

RELATED APPLICATION

This patent is a continuation of International Patent Application Ser. No. PCT/EP2010/006731, filed Nov. 4, 2010, which claims priority to German Patent Application No. DE 10 2009 056 383.0, filed Nov. 30, 2009, both of which are hereby incorporated herein by reference in their entireties.

FIELD OF THE DISCLOSURE

This patent relates generally to coupling pins and, more specifically, to coupling pins for connecting weapon components.

BACKGROUND

There are various known methods of attaching and/or connecting weapon components to a weapon and/or firearm. Weapon components have manufacturing tolerances when produced that may cause play and/or a non-secure coupling between the weapon components once assembled. For example, play and/or a non-secure coupling or fitting may occur when assembling and/or coupling two casing components such as an upper casing part and a lower casing part. The play and/or non-secure coupling or fitting may affect the functionality of the weapon and/or the functionality of auxiliary devices that may be mounted to the weapon. If there is play and/or a non-secure coupling between the upper casing part (e.g., upper receiver) and the lower casing part (e.g., lower receiver), a sight mounted to the weapon may not be as functional and/or the aiming precision of the weapon may be reduced.

To reduce and/or compensate for the play between the casing parts, rubber pieces or studs may be positioned between the upper and lower casing parts such that when the casing parts are assembled, the rubber pieces compress and apply a force or tension on the opposing casing parts that reduces the play between these casing parts. However, because the rubber pieces are continually compressed by the casing parts, over time the rubber pieces may permanently deform and have reduced elastic, tension and/or spring force properties. Thus, the ability of the rubber pieces to reduce and/or compensate for play between the casing parts may be diminished. As such, the rubber pieces may be regularly replaced, which increases maintenance and upkeep costs of the weapon.

DE 10 2006 011 099 B4, AT 325 463 B, and US 2008/0236016 A1 illustrate various known approaches of coupling weapon components together.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity. Additionally, several examples have been described throughout this specification. Any features from any example may be included with, a replacement for, or otherwise combined with other features from other examples. Further, throughout this description, position designations such as "above," "below," "top," "forward," "rear," "left," "right," etc. are referenced to a firearm held in a normal firing position (i.e., wherein the "shooting direction" is pointed away from the marksman in a generally horizontal direction) and from the point of view of the marksman. Furthermore, the normal firing position of the weapon is always assumed, i.e., the position in which the barrel runs along a horizontal axis.

The examples described herein relate to coupling pins or fasteners for attaching and/or coupling weapon components together and/or to a weapon. More specifically, the examples described herein relate to coupling pins or fasteners for use with weapon or firearm casing components, a weapon or firearm casing (e.g., upper and/or lower receivers) and/or a weapon or firearm.

The examples described herein relate to example coupling pins or fasteners for attaching and/or coupling weapon components and, specifically, for attaching and/or coupling weapon casing components. The example fasteners may be removably inserted into weapon components to secure and/or couple the weapon components together. The first weapon component may include one or more supporting areas having one or more supporting surfaces and the second weapon component may include one or more positioning areas having one or more positioning surfaces. An axially adjustable tension pin or member may be positioned within the example fastener. The tension pin may be spring loaded and may extend from the fastener adjacent the positioning area of the second weapon component to exert a force on the positioning surface. The force exerted by the tension pin at the positioning area may adjust, brace and/or tighten the positioning surface against the supporting surface at approximately a right angle relative to an installation direction of the fastener.

The examples described herein relate to coupling pins or fasteners for use with weapon casings and/or weapons.

Figure 1:
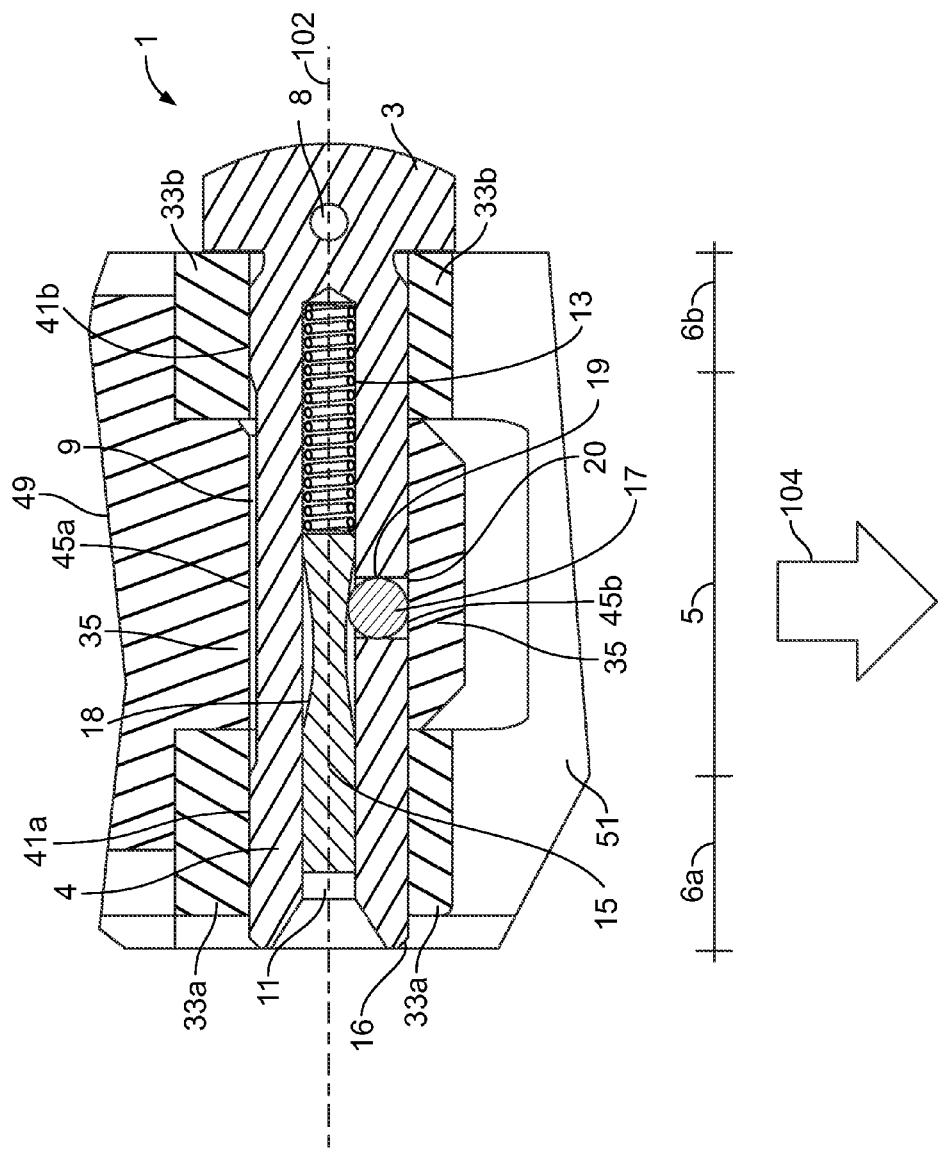
FIG. 1 depicts a longitudinal cross-sectional view of an example coupling pin in a tightened position via an example tension pin and fully inserted in an example weapon component.

FIG. 1 depicts a longitudinal cross-sectional view of an example coupling pin or fastener 1 that may be configured to attach and/or couple first and second weapon components 49 and 51 together and/or relative to one another. The first weapon component 49 may be a casing or housing upper part or upper receiver and the second weapon component 51 may be a casing or housing lower part or lower receiver.

The fastener 1 includes a head 3 and an elongated body or cylindrical coupling pin casing 4. The head 3 may include a recess or blind hole 7 (FIG. 2) that may be configured as a locking indentation to enable the fastener 1 to be secured relative to the first and/or second weapon components 40 and/or 51, for example. The recess 7 may be associated with, aligned with and/or correspond to one or more holes or apertures 8 (FIG. 2) defined by the head 3. The elongated body 4 may include a first portion or central positioning area 5 that may be positioned between a second portion or supporting area 6a and a third portion or supporting area 6b.

The elongated body 4 may include a tapered portion, partial taper or groove 9 that extends along the first portion 5 in the longitudinal direction of the fastener 1. The tapered portion 9 may be bordered by and/or positioned between a first raised section 41a and a second raised section 41b of the elongated body 4. The raised sections 41a and 41b may be associated with and/or define the respective second and third portions 6a and 6b of the elongated body 4. In some examples, the tapered portion 9 and/or the first portion 5 of the fastener 1 is sized such that a positioning surface or plate 35 of the first weapon component 49 is positioned within and/or lies fully within a length of the portions 5 and/or 9 when the fastener 1 is installed and/or positioned within the weapon components 49 and 51. Specifically, the plate 35 of the first weapon component 49 may be positioned adjacent the tapered portion 9, between the second and third portions 6a and 6b and between the raised sections 41a and 41b of the fastener 1.

The second and third portions 6a and/or 6b and/or the raised sections 41a and/or 41b of the fastener 1 may interact with supporting surfaces or plates 33a and/or 33b of the second weapon component 52 to at least partially support, secure and/or position the fastener 1 relative to the first and/or second weapon components 49 and/or 51 and/or to secure, brace and/or couple the weapon components 49 and 51 relative to one another. The second and third portions 6a and/or 6b and/or the raised sections 41a and/or 41b of the fastener 1 may interact with the supporting surfaces or plates 33a and/or 33b of the second weapon component 52 in areas and/or regions in which one or more of the portions 6a and/or 6b, the raised sections 41a and/or 41b and/or the plates 33a and/or 33b overlap, for example.

The tapered portion 9 may be positioned along a circumferential portion relative to an equator of the elongated body 4 to enable the plate 35 to be adjusted relative to the plates 33a and/or 33b at approximately a right angle relative to a longitudinal axis 102 of the fastener 1, the first weapon component 49 and/or the second weapon component 51.

Figure 1A:
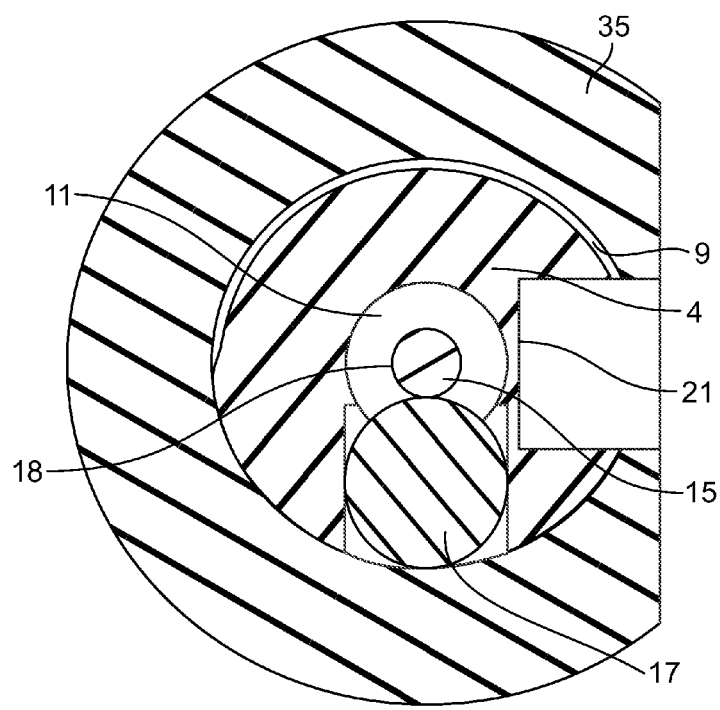
FIG. 1a depicts a cross-sectional via of the coupling pin of FIG. 1 along section A-A of FIG. 4 in which the example tension pin is in a released position.
Figure 4:
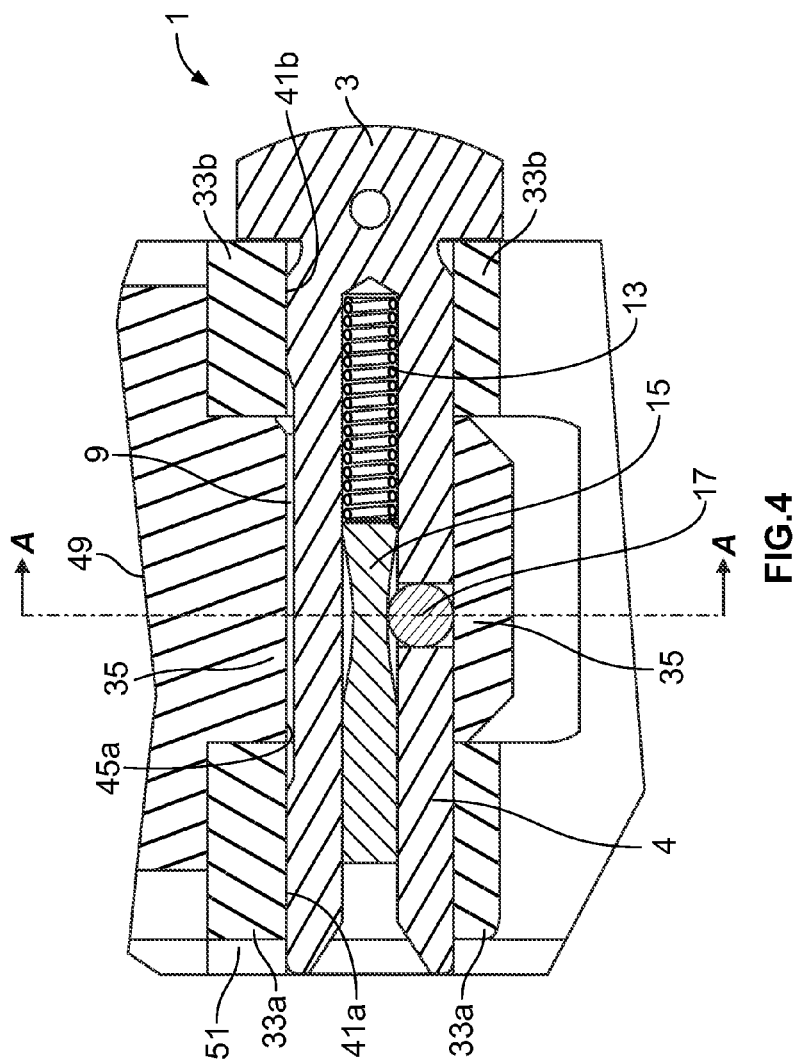
FIG. 4 depicts a longitudinal cross-sectional view of the example coupling pin of FIG. 3 in which the coupling pin is fully inserted into the weapon component and the tension pin is in a released position.

FIG. 1a illustrates the tapered portion 9 of the elongated body 4 in cross-section taken along line A-A of FIG. 4 through the plate 35. As illustrated in FIG. 1a, a tension pin, member or element 15 is shown positioned in a released positioned in which the tension pin 15 does not exert a force and/or a substantial force against a tension element, pin or portion 17. The tension member 17 may be an elongate member, a spherical member, an oblong member, etc. The tension element 17 may be positioned in an aperture, recess or hole 19 defined by the elongated body 4. While not shown, in some examples, instead of or in addition to the tapered portion 9, the aperture, eyelet or hole defining a positioning surface (e.g., the plate 35) may be extended relative to the plates 33a and/or 33b to ensure and/or enable adjustability.

The elongated body 4 may define and/or include a recess or blind hole 11 (FIG. 1) into which a biasing or spring element (e.g., a pressure or coil spring) 13 may be inserted and/or positioned. The biasing element 13 may act on and/or exert a force on a tension pin 15. In some examples, the tension pin 15 may have a tapered and/or conically tapered central portion adjacent an end 16 of the fastener 1. The conically tapered central portion of the tension pin 15 includes flanks, wedging surfaces and/or tapered surfaces 18 that may interact with the tension element 17. The tension element 17 may be cone shaped and may be radially positioned through the aperture(s) 19 defined by the elongated body 4. The tension element 17 may apply and/or enable adjustment of the plate 35 relative to the plates 33a and/or 33b. Lateral edges 20 adjacent an outer surface of the aperture 19 may be machined after the tension element 17 is positioned within the aperture 19. The aperture 19 may be caulked and/or otherwise shaped or capped to substantially prevent the tension element 17 from being inadvertently removed from the aperture 19.

To produce and/or manufacture the fastener 1, the biasing element 13 and the tension pin 15 may be inserted into the blind hole 11 such that the biasing element 13 may be at least partially compressed. The tension element 17 may then be inserted into the aperture 19 from the outside of the elongated body 4 and caulked and/or otherwise secured therein to prevent removal of the tension element 17 from the aperture 19, for example.

The fastener 1 may be adjusted by an operating device or tool (e.g., not shown) between a tightened position (FIG. 1) and a released position (FIG. 4). The operating device may be a cartridge, pen, etc. The tightened position may be associated with the flank 18 engaging and/or acting on the tension element 17 and the released position may be associated with the flank 18 being at a distance from and/or not substantially acting on the tension element 17. In the released position, the fastener 1 may be installed and/or removed from the weapon components 49 and/or 51. In the tightened position, the fastener 1 may adjust, brace and/or tighten the plate 35 relative to the plates 33a and/or 33b at approximately a right angle relative to an installation orientation of the fastener 1 (FIGS. 4 and 5) to adjust, brace and/or secure the weapon components 49 and 51 relative to one another.

In the tightened position, the tension pin 15 may act on the tension element 17 such that the tension element 17 at least partially extends from the aperture 19 toward the first weapon component 49. The biasing element 13 may exert an axial force on the tension pin 15 to urge the flanks 18 into further engagement with the tension element 17. A magnitude of the force exerted by the flanks 18 onto the tension element 17 may be related to the angle (e.g., wedge and/or cone angle) of the flanks 18 relative to a longitudinal axis of the tension element 17.

The illustrated example of FIG. 1 may accommodate the components (e.g., the biasing element 13, the tension pin 15, the tension element 17, etc.) prior to the fastener 1 being positioned in the tensioned position. The tension element 17 may be positioned adjacent to the plate 35 opposite a surface 45b. However, in this position, the tension element 17 may not yet be drawn into the positioning area 5 of the tapered portion 9.

Figure 2:
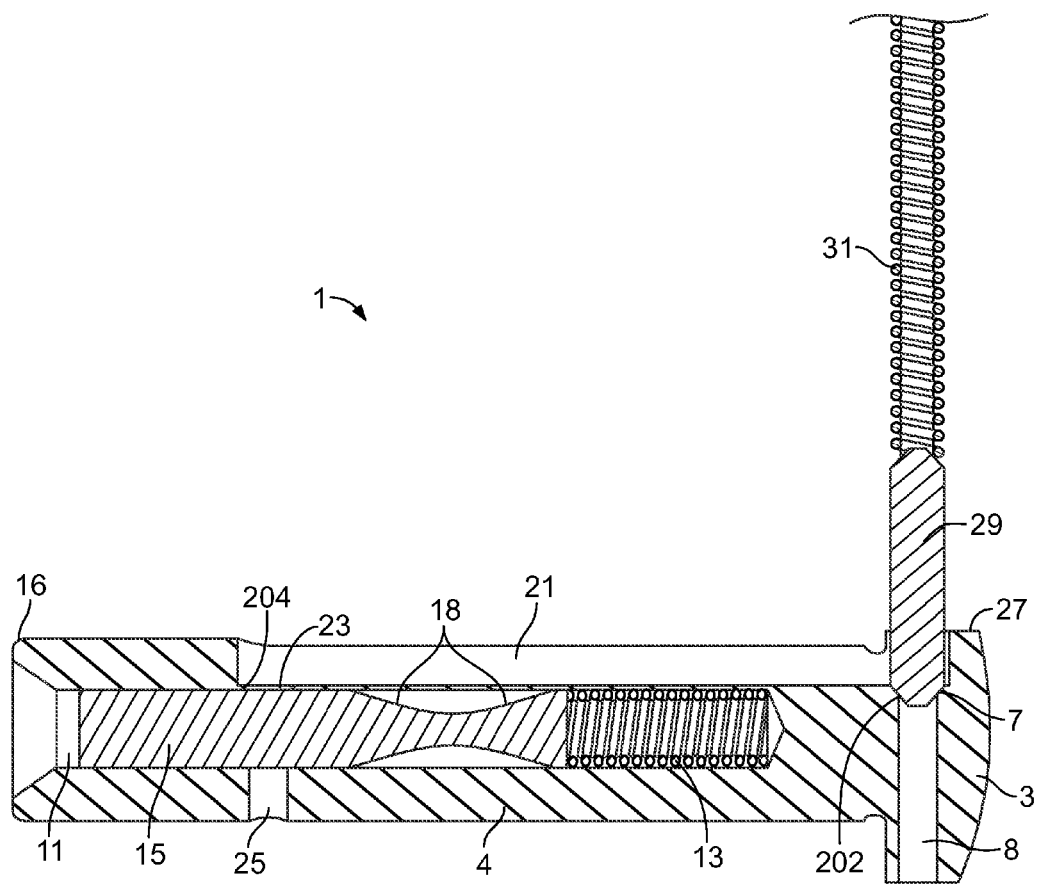
FIG. 2 depicts a longitudinal cross-sectional view of the example coupling pin of FIG. 1 rotated 90°.

FIG. 2 depicts a longitudinal cross-sectional view of the example fastener 1 rotated approximately 90° relative to the position illustrated in FIG. 1. The head 3 of the fastener 1 may include a flattened section or portion 27 that may be substantially flush with and/or have a similar diameter to the diameter of the elongated body 4. A longitudinal groove 21 may be defined from the head 3 along the elongated body 4 toward the end 16 of the fastener 1. To enable the fastener 1 to be further secured when positioned within the first and/or second weapon component 49 and/or 51, a spring-loaded retaining pin 29 may be positioned within and/or engage the longitudinal groove 21. A spring or biasing element (e.g., a pressure or coil spring) 31 may urge the retaining pin 29 into engagement with the longitudinal groove 21. The retaining pin 29 may be mounted and/or positioned at least partially within the first weapon component 49 and/or the second weapon component 51. For example, the retaining pin 29 may be positioned in a mounting fixture (not shown) configured and/or designed to receive the retaining pin 29.

When the fastener 1 is fully positioned within the first and/or second weapon components 49 and/or 51, the retaining pin 29 may be secured and/or snapped into the recess 7 in a spring like, form locking and/or snap fit manner. The aperture or hole 8 adjacent the recess 7 may extend from the recess 7 and through the head 3. The aperture 8 may have a smaller diameter than the diameter of the recess 7. Preferably the recess 7 may have a bevel or chamfer 202 adjacent an upper outer wall defining the recess 7 to enable the retaining pin 29 to be more easily released or removed from the recess 7 when the fastener 1 is being removed from the first and/or second weapon components 49 and/or 51.

When the fastener 1 is removed from the weapon components 49 and/or 51, the retaining pin 29 may be removed and/or released from the recess 7 and may slide in the longitudinal groove 21 toward a second recess or aperture 23. The retaining pin 29 may be positioned within the second recess 23 when the fastener 1 is substantially removed from the weapon components 49 and/or 51. A recess or aperture 25 may be positioned adjacent to the recess 23 and may extend through the elongated body 4. The aperture 25 may have a diameter that is smaller than a diameter of the recess 23. Preferably, the recess 23 includes a bevel or chamfer 204 adjacent an upper outer wall defining the recess 23 to enable the retaining pin 29 to be relatively easily removed from the recess 23.

FIGS. 1 and 3-5 depict various positions (e.g., assembly or disassembly) of the fastener 1 relative to the weapon components 49 and/or 51. To attach or secure the weapon components 49 and 51 together, the fastener 1 includes the supporting areas 6a and 6b and the positioning area 5 positioned between the supporting areas 6a and 6b. The supporting areas 6a and 6b and/or the positioning area 5 may engage the plates 33a and/or 33b and/or the plate 35, respectively, of the weapon components 49 and 51. The plate 35 and the plates 33a and/or 33b may be plates and/or portions of and/or coupled to the respective weapon components 49 and 51. The plate 35 and/or the plates 33a and/or 33b may be any suitable shape and may form an eyelet, a hinge bore, etc. or may be integrally coupled to the weapon components 49 and/or 51 such as, for example, as a borehole in a casing block (not shown).

Figure 3:
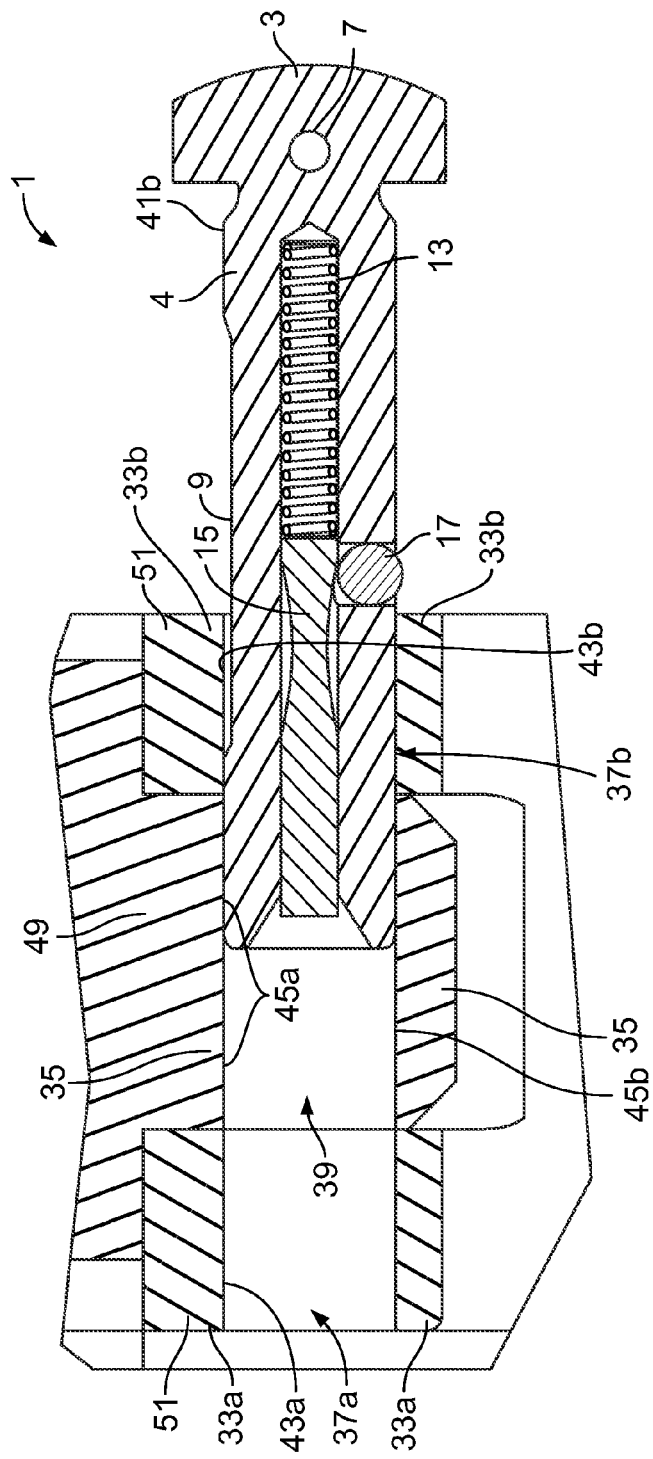
FIG. 3 depicts a longitudinal cross-sectional view of an example coupling pin that is partially inserted into an example weapon component.

As illustrated in FIG. 3, the plates 33a and 33b may define respective apertures or holes 37a and 37b and the plate 35 may define an aperture or hole 39. For example, the weapon component 51 may define the apertures 37a and 37b and a recess that receives a portion of the weapon component 49. The portion of the weapon component 49 may define the aperture 39 that may be at least partially aligned with the apertures 37a and 37b. The apertures 37a, 37b and 39 may be aligned such that the fastener 1 may be axially inserted through the apertures 37a, 37b and 39 when the apertures 37a, 37b and 39 are aligned and/or when the weapon components 49 and 51 are positioned in a securing position and/or hinged together. The aperture 39 may have a larger diameter than the apertures 37a and 37b to ensure sufficient play for the plate 35 to be adjusted relative to the plates 33a and 33b. If the aperture 39 has a larger diameter than the apertures 37a and 37b, the fastener 1 may not include the tapered portion 9, because the aperture 39 having the larger diameter may act similarly to the tapered portion 9 by enabling the plate 35 to be adjusted relative to the plates 33a and 33b and/or to the fastener 1. An outer surface of the fastener 1 and the inner surfaces of the apertures 37a and 37b may be produced to enable the fastener 1 to be positioned within the apertures 37a and 37b precisely and with limited play.

To install the fastener 1 into the weapon components 49 and 51, the retaining pin 29 may be retracted to enable the fastener 1 to be inserted into the aperture 37b. The retaining pin 29 may be retained or secured in the retracted position using, for example, a safety element, a retaining element, a lamella, plate, latch, etc. With the retaining pin 29 in the retracted position, the fastener 1 may be inserted (e.g., from the left) into the aperture 37b and subsequently through the apertures 39 and 37a of the plates 33a and 33b and the plate 35. However, alternatively, the fastener 1 may be inserted (e.g., from the right) into the aperture 37a and subsequently through the apertures 39 and 37b. When the fastener 1 is being inserted into the apertures 37a, 37b and 39, the longitudinal groove 21 of the elongated body 4 may face and/or be positioned toward the retained retaining pin 29 to enable the receipt thereof.

Figure 5:
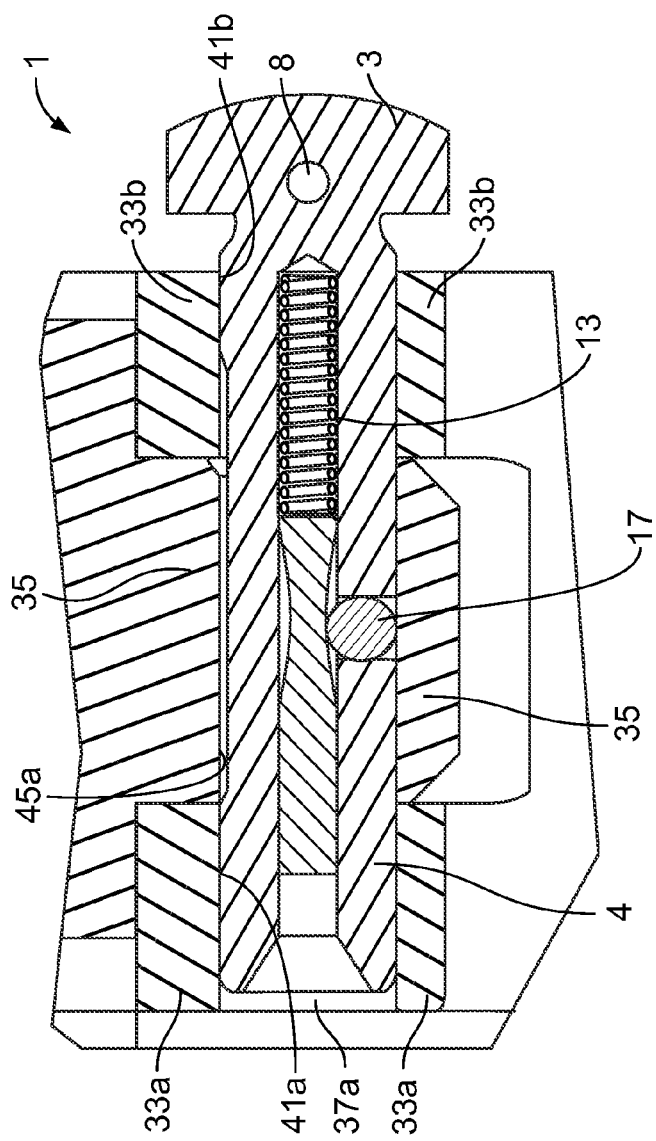
FIG. 5 depicts a longitudinal cross-sectional view of the example coupling pin of FIG. 4 partially removed from the weapon component.

As illustrated in FIGS. 3-5, once the fastener 1 has been inserted into the apertures 37a, 37b and 39 such that the tension element 17 engages the plate 33b (FIG. 3), the retaining pin 29 may be released by moving the safety or retaining element such that the biasing element 31 urges the retaining pin 29 into engagement with the longitudinal groove 21.

To fully insert the fastener 1 into the plates 33a, 33b and 35, the tension element 17 is moved from the tightened position to the released position by inserting a tip of a cartridge into the blind hole 11, moving the tension pin 15 toward the head 3 of the fastener 1 and compressing the biasing element 13. By moving the tension pin 15, the flanks 18 may not exert a substantial force on the tension element 17 enabling the tension element 17 to be more fully positioned in the aperture 19. When the fastener 1 is positioned in the released position, a larger force is applied to the head 3 of the fastener 1 via the biasing element 13. In the released position, the fastener 1 may be fully inserted into the plates 33a, 33b and 35 until the head 3 engages the plate 33b and the retaining pin 29 is positioned within the recess 7 to secure the fastener 1 relative to the weapon components 49 and 51. The engagement between the retaining pin 29 and the recess 7 may substantially prevent the fastener 1 from rotating within the apertures 37a, 37b and/or 39 when using and/or firing the weapon.

When the fastener 1 is fully inserted into the plates 33a, 33b and 35, the tension pin 15 may be released by removing the cartridge or pen which in turn enables the biasing element 13 to move the tension pin 15 toward the end 16 of the fastener 1 and into the tightened position. In the tightened position, the flanks 18 of the tension pin 15 may engage and exert a radial force on the tension element 17 that urges the tension element 17 out of the aperture 19 and into engagement with the surface 45b of the plate 35.

When the fastener 1 is fully inserted into the plates 33a, 33b and 35, the raised sections 41a and/or 41b of the elongated body 4 interact with and/or engage the opposing surfaces 43a and 43b of the plates 33a and 33b to provide support to and/or brace the second weapon component 51 relative to the first weapon component 49. The tension element 17 may also exert a force on the surface 45b. Because of the support provided by the fastener 1 and the force applied by the tension element 17 to the plate 35, the plate 35 is moved downwardly and/or in a direction generally indicated by arrow 104 (FIG. 1) relative to the plates 33*a* and 33*b* such that a surface 45*a* of the plate 35 is moved toward and/or into the tapered portion 9 to secure, tighten, brace and/or couple the weapons components 49 and 51 relative to one another. In some examples, the width and/or size of the tapered portion 9 may be larger than a width and/or size of the plate 35 and, thus, the surface 45*a*. As such, the plate 35 may be adjustable and/or freely moveable relative to the plates 33*a* and 33*b* to ensure a secure coupling between the weapon components 49 and 51.

Because of the adjustment, bracing, tightening and/or sliding of the plate 35 caused by the interaction with the tension element 17, potential play between the plates 33*a*, 33*b* and/or 35 due to manufacturing tolerances may be substantially eliminated. As such, the examples described herein enable the weapon components 49 and 51 to be securely coupled to one another regardless of the manufacturing tolerances of these weapons components 49 and 51. In some examples, an additional coupling pin or fastener (not shown) may be installed on an opposite side(s) of the weapon components 49 and 51 to enable any remaining potential play between the weapon components 49 and 51 to be fully eliminated.

To remove the fastener 1 from the plates 33*a*, 33*b* and 35 to, for example, open and/or separate the weapon components 49 and 51, a pen or cartridge tip may be inserted into the blind hole 11 at the end 16, the tension pin 15 may be moved toward the head 3 and the biasing element 13 may be compressed. By moving the tension pin 15 toward the head 3, the tension element 17 is released and the fastener 1 may be removed or pulled out of the plates 33*a*, 33*b* and 35. As the fastener 1 is removed from the plates 33*a*, 33*b* and 35, the bevel or chamfer 202 adjacent the recess 7 enables the retaining pin 29 to be more easily removed from the recess 7.

In the released position, the fastener 1 may be removed such that the retaining pin 29 slides and/or moves within the longitudinal groove 21 toward an end of the longitudinal groove 21 opposite the head 3. At the end of the longitudinal groove 21, the retaining pin 29 may be positioned in and/or adjacent to the recess 23 in a form-locking, snap-fit and/or secure manner. The interaction between the retaining pin 29 and the recess 23 enables the fastener 1 to be securely attached to one of the weapon components 49 and/or 51 such as the second weapon component 51, for example. With the fastener 1 removed from the plate 33*a* and/or the plate 35, the weapon components 49 and 51 may be separated from one another by rotating or moving the weapon components 49 and 51 upwards, downwards, to the side, etc. relative to one another. With the retaining pin 29 engaged with the recess 23, the retaining pin 29 may not be removed from the longitudinal groove 21 because the tension pin 15 may cover and/or block access to the aperture 25 such that the retaining pin 29 may not extend through the aperture 25 to enable the retaining pin 29 to be released. To remove the fastener 1 fully or entirely from the plates 33*a*, 33*b* and/or 35, the fastener 1 may be returned to being fully positioned within the plates 33*a*, 33*b* and 35.

When the fastener 1 is fully positioned within the plates 33*a*, 33*b* and/or 35, for example, a thin pen, bolt, cartridge or other object may be inserted into the aperture 8 in the head 3 opposite the retaining pin 29. The object may be inserted into the aperture 8 to engage and move the retaining pin 29 out of engagement with the recess 7.

By further moving the retaining pin 29 away from the recess 7, the retaining pin 29 may be removed from the longitudinal groove 21 to be at a distance from the head 3. In the retracted position, the retaining pin 29 may be retained by a safety element, a retaining element, a steel or metal plate, etc. between the flattened section 27 of the head 3 and the second weapon component 51, for example. The retaining element (not shown) may be used to retain the retaining pin 29 in a retracted position and/or substantially within the second weapon component 51. The tension pin 15 may then be moved within the elongated body 4 using a tool such that the biasing element 13 is compressed and the flanks 18 no longer exert a substantial force on the tension element 17 to enable the fastener 1 to be removed from the plates 33*a*, 33*b* and 35.

Figure 6:
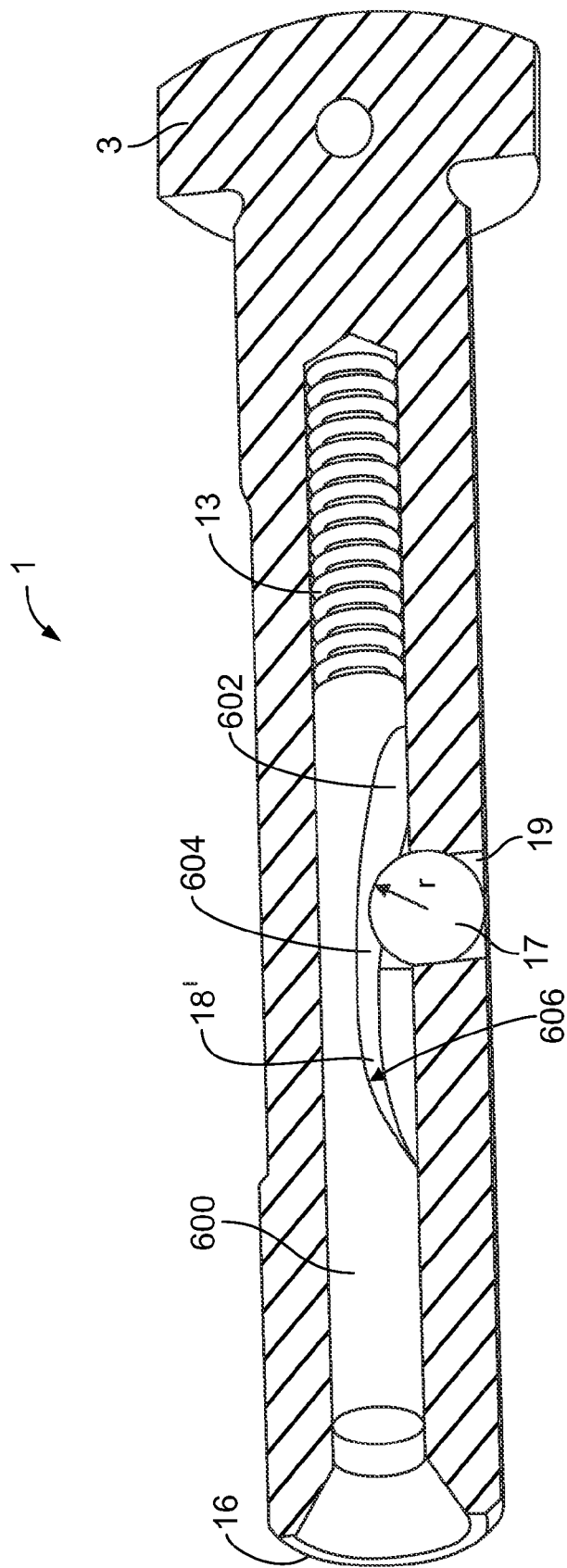
FIG. 6 depicts a perspective cross-sectional view of an example coupling pin and an alternative example tension pin.
Figure 7:
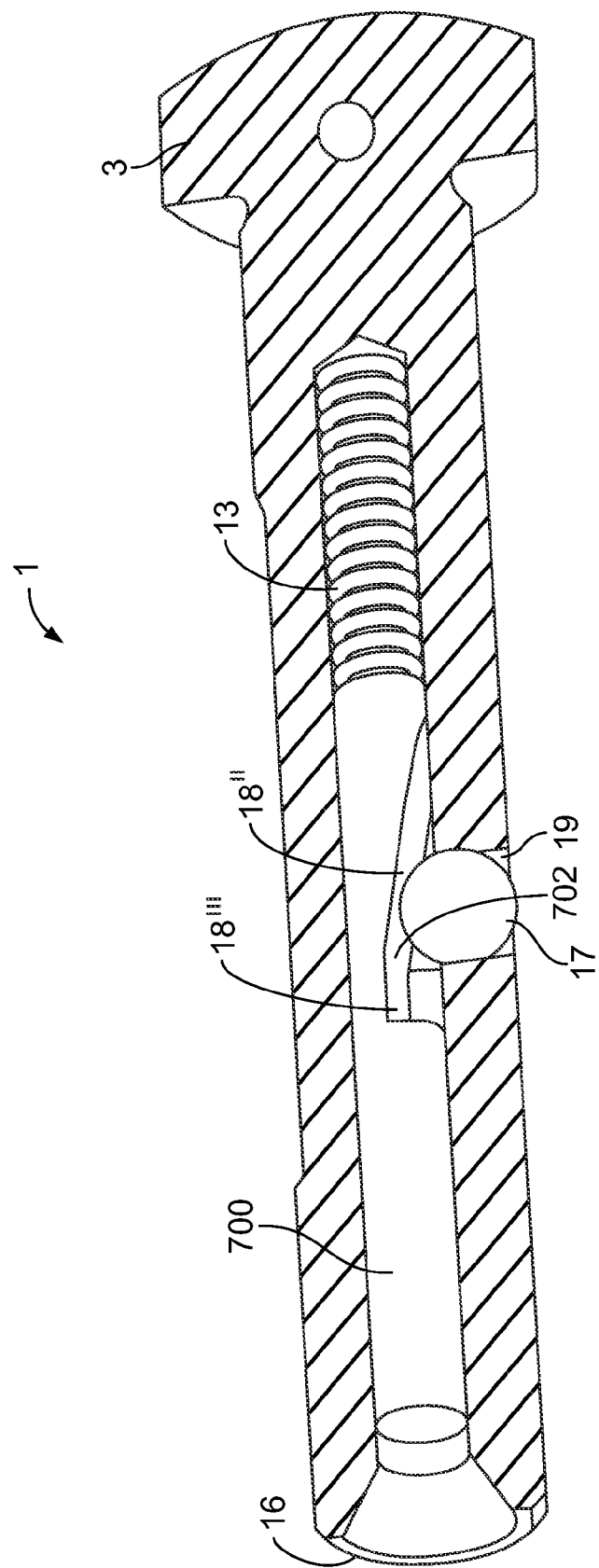
FIG. 7 depicts a perspective cross-sectional view of an example coupling pin and an alternative example tension pin.
Figure 8:
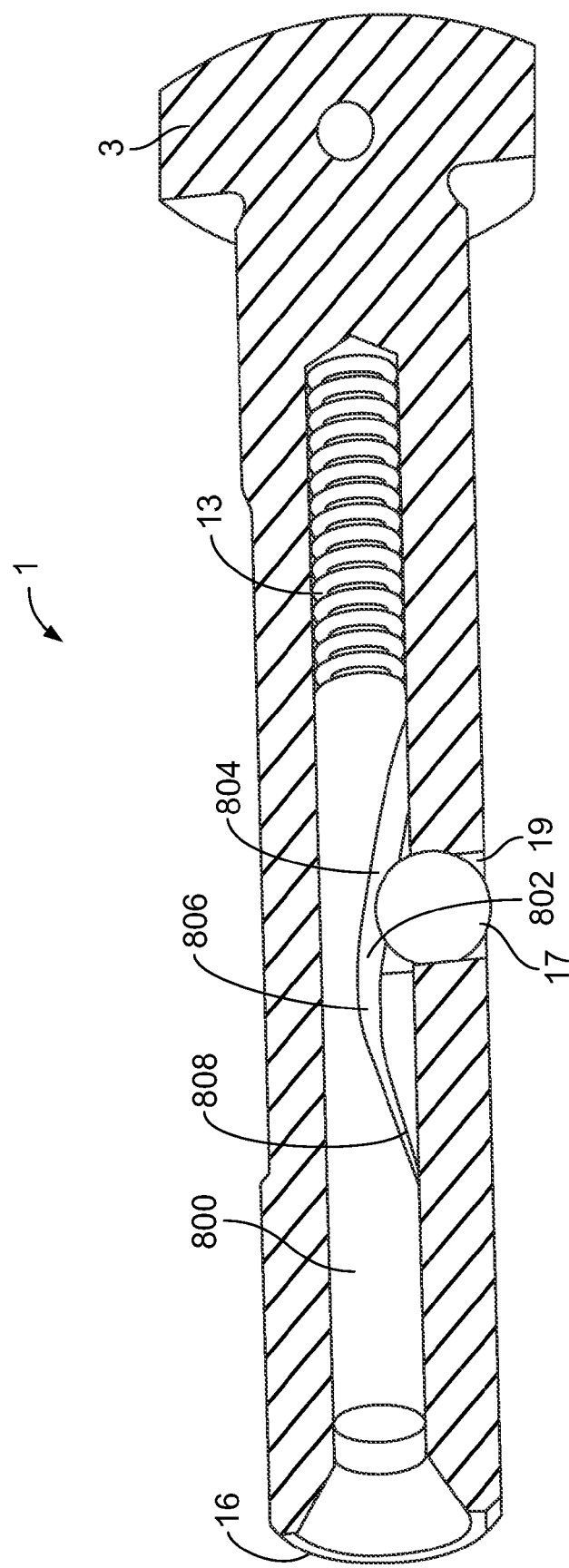
FIG. 8 depicts a perspective cross-sectional view of an example coupling pin and an alternative example tension pin.

FIGS. 6-8 depict alternative example tension pins or elements 600, 700 and 800.

The tension element 600 of FIG. 6 includes a flank section, curved section or portion 18' that may be rounded and/or cylindrical on a side of the flank section 18' proximate the head 3 to an end of the flank section 18'. An end 602 of the flank section 18' proximate the biasing element 13 may interact with and/or engage the tension element 17 and move and/or push the tension element 17 out of the aperture 19 and into the tightened position. In the released position, a central region 604 of the flank section 18' may be located adjacent to and/or above the tension element 17 to enable the tension element 17 to move within the aperture 19. A portion or rounded section 606 of the flank section 18' may have a shape corresponding to a shape of the tension element 17. For example, the rounded section 606 may have a curvature that corresponds to a radius r of the tension element (e.g., a ball, sphere, etc.) 17. The shape of the rounded section 606 enables the flank section 18' in the tensioned position to be releasably wedged against the tension element 17 to substantially prevent the release and/or removal of the tension pin 15 and/or the fastener 1.

The tension element 700 of FIG. 7 includes a flank section (e.g., a substantially flat flank section) 702 that is defined and/or formed on a side of the tension element 700 from a position adjacent the head 3 to a position adjacent the end 16. The flank section 702 may include a first section or wedge shaped flank section 18" adjacent the head 3 and/or biasing element 13 and a second section or wedge shaped flank section 18' that may be positioned axially along and/or substantially parallel to a longitudinal axis of the fastener 1. In the tightened position, the first wedge shaped flank section 18" may interact with and/or engage the tension element 17 and urge the tension element 17 out of the aperture 19. In the released position, the second section 18' may be positioned adjacent to and/or above the tension element 17 to enable the tension element 17 to be moveable within the aperture 19.

The tension element 800 of FIG. 8 includes a flank section 802 that may be defined and/or formed on one side of the tension element 800 from a position adjacent the head 3 to a position adjacent the end 16. The flank section 802 may include a first section or wedge shaped flank section 804, a second section or wedge shaped flank section 806 and a third section or wedge shaped flank section 808. The second section 806 may be axially positioned and may be substantially parallel to a longitudinal axis of the fastener 1. In the tightened position, the first section 804 adjacent the biasing element 13 may interact with and/or engage the tension element 17 to urge the tension element 17 out of the aperture 19. In the released position, the second section 806 may be positioned adjacent to and/or above the tension element 17 to enable the tension element 17 be moveable within the aperture 19.

In some examples, the flanks and/or contours of the examples illustrated in FIGS. 6-8 may surround the entire and/or a substantial portion of the tension element 600, 700 and/or 800 (e.g., the flanks and/or contours may surround the circumference of the tension element 600, 700 and/or 800).

The examples described herein enable the attachment of weapon components with relatively little, if any, play between the weapon components.

The fastener 1 may be used to attach weapon components 49 and 51 together. The fastener 1 may be removably inserted into the weapon component 49 and 51. The fastener 1 may include the one or more supporting areas 6a and 6b. The supporting areas 6a and/or 6b may be axially positioned relative to the supporting surfaces or plates 33a and/or 33b, respectively, when the fastener 1 is inserted into the weapon components 49 and 51. The fastener 1 may include the positioning area 5. The positioning area 5 may be axially positioned relative to the positioning surface or plate 35 when the fastener 1 is inserted into the weapon components 49 and 51.

The fastener 1 may include the tension pin 15 that is axially adjustable via the biasing element 13. The tension pin 15 may act on the tension element 17 at a substantially right angle relative to the tension pin 15. The tension element 17 may extend from the fastener 1 adjacent the positioning area 5 and exerts a force on and/or interacts with the positioning surface or plate 35 of the weapon component 49 to adjust, brace and/or tighten the positioning surface or plate 35 relative to the supporting surface or plates 33a and/or 33b at a substantially right angle relative to the longitudinal axis 102 of the fastener 1.

The examples described herein relate to weapon casing(s) and/or weapons including one or more fasteners 1.

The tightening and/or movement of the positioning surface or plate 35 relative to the supporting surfaces or plates 33a, 33b, etc., at a substantially right angle relative to the longitudinal axis 102 of the fastener 1 (e.g., at a right angle relative to the installment direction of the fastener 1) substantially ensures that potential play between the weapon components 49 and/or 51 and/or between the positioning surface or plate 35 and/or the supporting surfaces or plates 33a and 33b is substantially limited, reduced or eliminated.

Providing the weapon components 49 and 51 with the positioning surface or plate 35 and the supporting surfaces or plates 33a and 33b enables the weapon components 49 and/or 51 and/or the fastener 1 to be relatively easily and/or simply manufactured and/or secured relative to one another. The weapon components 49 and/or 51 may be any type of weapon components that are attachable in a variety of ways. In some examples, the weapon components may be casing shells, weapon components including Picatinny rails or other auxiliary devices that may be attached and/or coupled to the casings. The length of supporting surface, supporting area, the positioning area and the positioning surfaces substantially prevents the removal of the fastener 1 and/or substantially secures the weapon components 49 and 51 together. An interaction between the tension pin 15 and the tension element 17 provides a defined and/or substantially reproducible adjustment force that increases the functionality, safety and/or reliability of the fastener 1.

The fastener 1 may be adjusted using an operating device between a tightened position and a released position. The fastener 1 may, in the released position, be removed from and/or inserted into the weapon components 49 and 51. The fastener 1 may, in the tightened position, hold, secure and/or tighten the positioning surface or plate 35 against the supporting surfaces or plates 33a and 33b. In some examples, structure may be provided to substantially prevent the fastener 1 from being inadvertently and/or unintentionally removed from the weapon components 49 and/or 51.

The fastener 1 may attach and/or fix the positioning surface or plate 35 relative to and positioned between the supporting surfaces or plates 33a and 33b. The fastener 1 may be supported on each side to effectively prevent and/or substantially prevent canting of the fastener 1 and/or the weapon components 49 and/or 51 and improving its supporting functionality. The length of the supporting surfaces, the supporting areas, positioning surface and/or positioning area may be reduced to a small degree to enable a compact design to be obtained. The examples described here may enable a greater degree of adjustment and tension forces to be applied between the weapon components 49 and 51.

The tension pin 15 may include wedge shaped sections 18 to provide a force-transferring connection with the tension element 17 that radially urges the tension element 17 from the positioning area 5 when the fastener 1 is in the tightened and/or clamping position. The sections 18 may be have a conical shape, a truncated shape, a rounded pin head or any other suitable shape. If the section 18 has a rounded pinhead shape, the sections 18 may engage the tension element 17 to urge or push the tension element 17 away from the positioning area 5. The area of the tension pin 15 (e.g., the section 18) that interacts with the tension element 17 may be positioned on one side of the tension pin, both sides of the tension pin 15, about the entire circumference of the tension pin 15 or on one or more portions of the tension pin 15. The area of the tension pin 15 that interacts with the tension element 17 may have wedge shaped surfaces, truncated cone shaped surfaces, curved surfaces, sloped surfaces, etc.

In some examples, the area of the tension pin 15 that interacts with the tension element 17 is conical. A conical surface or design may increase the functionality, security and/or interaction between the tension pin 15 and the tension element 17 because the tension pin 15 may rotate or move relative to the tension element 17 and/or the fastener 1 and still properly interact with the tension element 17. As such, the fastener 1 and/or the tension element 17 may not be incorrectly installed.

The fastener 1 may include the recess or tapered portion 9 adjacent and/or of the positioning area 5 to receive and/or accommodate the surface 45a. The recess or tapered portion 9 enables the positioning surface or plate 35 to be moved relative to the supporting surfaces or plates 33a and/or 33b with the fastener 1 positioned within the weapon components 49 and 51 (e.g., there is play between the positioning surface or plate 35 and the supporting surfaces or plates 33a and/or 33b). Additionally or alternatively, the positioning surface or plate 35 may include a recess, eyelet, hinge bore and/or sleeve to increase the diameter of the aperture 39 relative to the size of the apertures 37a, 37b.

The safety element or retaining pin 29 may be used to substantially prevent the coupling pin from being inadvertently removed from the weapon components 49 and 51. The retaining pin 29 reliably prevents the fastener 1 from being lost.

The retaining pin 29 may be spring loaded to urge the retaining pin 29 into engagement with the recess or longitudinal groove 21 of the fastener 1. Biasing the retaining pin 29 substantially ensures proper and/or effective engagement between the retaining pin 29 and the fastener 1 in a cost-effective manner.

The fastener 1 may include the recesses 7 and 23 into which the retaining pin 29 is received in a snap fit manner. The recesses 7 and 23 substantially ensure the retaining pin 29 properly secures the fastener 1 relative to the weapon components in a cost-effective manner.

The retaining pin 29 may be disengaged and/or removed from the recesses 7 or 23 using an operating device. The operating device may be an object, a pin, a bolt, a cartridge tip or any other device. As such, no additional tools are needed to disengage the retaining pin 29 from the respective recess 7 or 23.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A coupling pin for coupling weapon components, comprising:
   an elongated body comprising an outer surface, a longitudinal bore, and a second bore, the second bore extending between the outer surface and the longitudinal bore, the outer surface of the body comprising:
   a longitudinal recess opposite an opening of the second bore;
   a first supporting area adjacent one end of the body;
   a second supporting area adjacent another end of the body; and
   a positioning area between the first and second supporting areas, the longitudinal recess being at least partially formed within the positioning area,
   wherein the coupling pin is insertable into aligned first apertures of a first weapon component, the first apertures defined by supporting surfaces, the supporting surfaces to be axially positioned relative to the first and second supporting areas when the coupling pin is inserted into the weapon components, wherein the coupling pin is insertable into a second aperture of a second weapon component, the second aperture defined by a positioning surface, the first apertures being substantially aligned with the second aperture, the positioning surface to be axially positioned relative to the positioning area when the coupling pin is inserted into the weapon components;
   a spring loaded tension pin positioned in the longitudinal bore; and
   a tension element positioned in the second bore,
   wherein the tension pin is spring biased towards and engages the tension element to urge the tension element out of the second bore toward and into engagement with the positioning surface to at least one of adjust or brace the positioning surface relative to the supporting surfaces at substantially a right angle relative to a longitudinal axis of the coupling pin and to urge a surface defining the second aperture into or toward the longitudinal recess.

2. The coupling pin of claim 1, wherein the coupling pin is moveable between a tightened position and a released position, in the released position, the coupling pin is removable from or installable into the weapon components, in the tightened position, the positioning surface and the supporting surface of the respective weapon components are at least one of adjusted or braced relative to one another.

3. The coupling pin of claim 1, wherein the coupling pin is configured to couple the positioning surfaces and the supporting surfaces of the respective weapon components, the positioning surface to be positioned between the supporting surfaces.

4. The coupling pin of claim 1, wherein the tension pin comprises a wedge-shaped section that interacts with the tension element to radially urge the tension element from the coupling pin when the coupling pin is in a tightened position.

5. The coupling pin of claim 1, wherein the tension pin comprises at least one of a conical section or shape or truncated cone shape or section that interacts with the tension element to radially urge the tension element from the coupling pin when the coupling pin is in a tightened position.

6. The coupling pin of claim 1, wherein the body defines a groove to receive a retaining pin that substantially prevents the removal of the coupling pin from at least one of the weapon components.

7. The coupling pin of claim 6, wherein the groove comprises one or more recesses to receive an end of the retaining pin.

8. A fastener to couple weapon components, comprising:
   an elongated body having an outer surface and a longitudinal bore, a second bore extending between the outer surface and the longitudinal bore, and a longitudinal groove formed in the outer surface opposite an opening of the second bore, the outer surface of the body comprising:
   a supporting area; and
   a positioning area, the longitudinal groove being formed within the positioning area, wherein the fastener is insertable into a first aperture of a first weapon component, the first aperture defined by a supporting surface, the supporting surface to be axially positioned relative to the supporting area when the fastener is inserted into the weapon components, wherein the fastener is insertable into a second aperture of a second weapon component, the second aperture defined by a positioning surface, the first aperture being substantially aligned with the second aperture, the positioning surface to be axially positioned relative to the positioning area when the fastener is inserted into the weapon components;
   a tension member and a biasing element positioned in the longitudinal bore, the biasing element to bias the tension member; and
   a tension element at least partially positioned in the second bore,
   wherein the tension member is biased towards and engages the tension element to urge the tension element outwardly from the second bore and to exert a force on the positioning surface to adjust the positioning surface relative to the supporting surface at an angle relative to a longitudinal axis of the fastener and to urge a surface defining the second aperture into the longitudinal groove.

9. The fastener of claim 8, wherein the tension member comprises one or more tapered surfaces, conical surfaces, or curved surfaces that interact with the tension element to urge the tension element from the elongated body.

10. The fastener of claim 8, wherein the tension member is moveable between a first position and a second position, in the first position, the fastener being longitudinally moveable relative to the apertures, in the second position, the fastener being secured relative to the aligned apertures and the weapon components being coupled together.

11. The fastener of claim 10, wherein the tension member is movable to the first position by moving the tension member against the biasing element.

12. The fastener of claim 8, wherein the elongated body defines a second groove to receive a biased retaining pin that is to retain the elongated body within at least one of the weapon components.

13. The fastener of claim 8, wherein the tension element comprises an elongate member, a spherical member, or an oblong member.

14. A firearm, comprising:
   a first weapon component defining first and second aligned apertures and a recess therebetween;

a second weapon component including a portion to be at least partially received by the recess, the portion defining a third aperture to be at least partially aligned with the first and second apertures;

a fastener to be positioned within the first, second and third apertures to couple the first and second weapon components, the fastener comprising:

an outer surface;

a longitudinal bore;

a second bore extending between the outer surface and the longitudinal bore, and a longitudinal groove formed in the outer surface opposite an opening of the second bore;

a spring biased tension member positioned within the longitudinal bore and movable within the fastener between a first position and a second position;

a tension element at least partially positioned within the second bore, wherein, in the first position, the tension member is in a retracted position to substantially not act on the tension element to enable the fastener to be removed from or installed within the apertures, and in the second position, the tension member is in an extended position to engage the tension element to urge the tension element outwardly from the second bore and into engagement with a surface defining the third aperture to urge a surface defining the third aperture into the longitudinal groove.

15. The firearm of claim 14, further comprising a retaining element extending at least partially through one of the first weapon component or the second weapon component, an end of the retaining element to be received by a second groove of the fastener to substantially prevent the fastener from being removed from at least one of the first weapon component or the second weapon component.

16. The firearm of claim 15, wherein the retaining element is biased into engagement with the second groove of the fastener.

17. The firearm of claim 15, wherein the retaining element is removable from the second groove using an operating device or tool.

18. A coupling pin for coupling weapon components, comprising:

an elongated body comprising an outer surface, a longitudinal bore, a second bore, and a longitudinal recess, the second bore extending between the outer surface and the longitudinal bore, the longitudinal recess formed in the outer surface opposite an opening of the second bore, the outer surface of the body comprising:

a supporting area; and a positioning area, the longitudinal recess being at least partially formed within the positioning area, wherein the coupling pin is insertable into a first aperture of a first weapon component, the first aperture defined by a supporting surface, the supporting surface to be axially positioned relative to the supporting area when the coupling pin is inserted into the weapon components, wherein the coupling pin is insertable into a second aperture of a second weapon component, the second aperture defined by a positioning surface, the first aperture being substantially aligned with the second aperture, the positioning surface to be axially positioned relative to the positioning area when the coupling pin is inserted into the weapon components;

a tension pin at least partially positioned in the longitudinal bore; and a tension element at least partially positioned in the second bore, wherein the tension pin is spring biased towards and engages the tension element to urge the tension element outwardly from the second bore and to exert a force on the positioning surface to adjust the positioning surface relative to the supporting surface at a substantially right angle relative to a longitudinal axis of the coupling pin and to urge a surface defining the second aperture into the longitudinal recess.

\* \* \* \* \*